(12) United States Patent
Burroughs et al.

(10) Patent No.: US 10,740,681 B2
(45) Date of Patent: Aug. 11, 2020

(54) PREDICTIVE MODELING FOR ADJUSTING INITIAL VALUES

(71) Applicant: Accenture Global Solutions Limited, Dublin (IE)

(72) Inventors: James S. Burroughs, Huntersville, NC (US); Mark Potts, Cherry Hills Village, CO (US); Sheethal Kumar, Chicago, IL (US); David B. Treat, Chicago, IL (US); Velayudhan Pillai, Chicago, IL (US); Vivek Kayarat, Ottapalam (IN)

(73) Assignee: Accenture Global Solutions Limited, Dublin (IE)

( * ) Notice: Subject to any disclaimer, the term of this patent is extended or adjusted under 35 U.S.C. 154(b) by 1241 days.

(21) Appl. No.: 15/001,952

(22) Filed: Jan. 20, 2016

(65) Prior Publication Data
US 2017/0132520 A1    May 11, 2017

(30) Foreign Application Priority Data
Nov. 9, 2015 (IN) .......................... 6039/CHE/2015

(51) Int. Cl.
*G06N 5/04* (2006.01)
*G06Q 40/06* (2012.01)
(Continued)

(52) U.S. Cl.
CPC .............. *G06N 5/04* (2013.01); *G06N 7/005* (2013.01); *G06Q 40/06* (2013.01); *G06N 20/00* (2019.01)

(58) Field of Classification Search
CPC combination set(s) only.
See application file for complete search history.

(56) References Cited

U.S. PATENT DOCUMENTS 6,430,539 B1 * 8/2002 Lazarus ................. G06Q 30/02
                                                          705/14.1
7,478,063 B2    1/2009 Knight
                        (Continued)

FOREIGN PATENT DOCUMENTS

CN            104424598           11/2011

OTHER PUBLICATIONS

Australian Office Action in Australian Application No. 2016250343, dated Dec. 18, 2017, 5 pages.
(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on a computer storage medium, for predictive modeling for adjusting initial values are disclosed. In one aspect, a method includes the actions of accessing transaction history data that indicates one or more transaction details associated with the transaction, a predicted value, and a final value. The actions further include determining a difference value between the predicted value and the final value. The actions further include generating a predictive model that is trained to estimate. The actions further include receiving one or more transaction details and a predicted value associated with a subsequently received transaction. The actions further include providing the one or more transaction details as input to the predictive model. The actions further include receiving an adjustment value to apply to the predicted value. The actions further include providing, for output, data indicating the adjustment value.

20 Claims, 4 Drawing Sheets

(51) Int. Cl.
*G06N 7/00* (2006.01)
*G06N 20/00* (2019.01)

(56) References Cited

U.S. PATENT DOCUMENTS

| | | |
|---|---|---|
| 7,580,872 B2 | 8/2009 | Van Slyke et al. |
| 8,498,925 B2 | 7/2013 | Lawrence |
| 2001/0029476 A1 | 10/2001 | Mallenbaum |
| 2004/0024690 A1 | 2/2004 | Satow et al. |
| 2009/0204535 A1 | 8/2009 | Lutnick et al. |
| 2010/0161379 A1* | 6/2010 | Bene .................. G06Q 30/02 705/7.31 |
| 2010/0257117 A1* | 10/2010 | Shvadron ............ G06Q 10/04 705/36 R |
| 2011/0295722 A1* | 12/2011 | Reisman ............ G06Q 30/0201 705/27.1 |
| 2012/0226645 A1* | 9/2012 | O'Rourke ............ G06Q 40/06 706/46 |
| 2014/0309987 A1* | 10/2014 | Maddali ............ G06Q 30/0282 704/9 |
| 2015/0127520 A1 | 5/2015 | Farnstrom et al. |
| 2016/0203553 A1 | 7/2016 | Cunningham |

OTHER PUBLICATIONS

Online machine learning—Wikipedia [retrieved from internet on Dec. 7, 2017] <URL:https://web.archive.org/web/20141231085432/http://en.wikipedia.org/wiki/Online_machine_learning> published on Dec. 31, 2014 as per Wayback Machine, 6 pages.
CA Office Action in Canadian Appln. No. 2,947,897, dated Jun. 18, 2019, 5 pages.

* cited by examiner

PREDICTIVE MODELING FOR ADJUSTING INITIAL VALUES

CROSS-REFERENCE TO RELATED APPLICATION

The present application claims the benefit of Indian Patent Application No. 6039/CHE/2015, filed on Nov. 9, 2015, which is incorporated herein by reference in its entirety for all purposes.

TECHNICAL FIELD

This application generally relates to predictive modeling.

BACKGROUND

Predictive modeling is a process used in predictive analytics to create a statistical model of future behavior. Predictive analytics is the area of data mining concerned with forecasting probabilities and trends.

SUMMARY

Entities may apply predictive models to future orders to identify adjustments to initially predicted values. Once an entity has identified a predicted value for an order, the entity may apply a predictive model to generate an adjustment value to the predicted value. The predictive model is trained to generate an adjustment value that improves the accuracy of the predicted value so that the adjusted predicted value has a high likelihood of matching a final value for the order. The predictive model may be trained using previous order data, previous predicted values, and previous final values.

An innovative aspect of the subject matter described in this specification may be implemented in a method that includes the actions of accessing transaction history data that, for each of one or more past transactions, indicates one or more transaction details associated with the transaction, a predicted value, and a final value, wherein the one or more transaction details include a sentiment associated with an entity requesting the transaction, a value sensitivity of the entity, and a relationship between the entity requesting the transaction and an entity processing the transaction; for each of the one or more past transactions, determining a difference value between the predicted value and the final value; for each of the one or more past transactions, generating, using the one or more transaction details and the difference value, a predictive model that is trained to estimate, based on one or more given transaction details and a given predicted value, an adjustment value to apply to the given predicted value; and receiving one or more transaction details and a predicted value associated with a subsequently received transaction; providing the one or more transaction details as input to the predictive model; in response to providing the one or more transaction details as input to the predictive model, receiving, from the predictive model, an adjustment value to apply to the predicted value; and providing, for output, data indicating the adjustment value.

These and other implementations can each optionally include one or more of the following features. The actions include accessing real-time data that is associated with the entity requesting the transaction; and based on the real-time data that is associated with the entity requesting the transaction, determining a real-time sentiment that is associated with the entity requesting the transaction. The action of providing the one or more transaction details as input to the predictive model includes providing data indicating the real-time sentiment that is associated with the entity requesting the transaction as additional input to the predictive model. The actions include accessing real-time data that is associated with the entity requesting the transaction and with the entity processing the transaction; and based on the real-time data that is associated with the entity requesting the transaction, determining a relationship between the entity requesting the transaction and the entity processing the transaction.

The action of providing the one or more transaction details as input to the predictive model includes providing data indicating the relationship between the entity requesting the transaction and the entity processing the transaction as additional input to the predictive model. The sentiment associated with an entity requesting the transaction is based on an analysis of media that includes references to the entity requesting the transaction and contexts of the references. The value sensitivity of the entity requesting the transaction is based on a likelihood of the entity to request adjusting the predicted value. The transaction is a stock trade. The predicted value is a predicted price per share. The adjustment value is an adjustment to the predicted price per share. The relationship between the entity requesting the transaction and the entity processing the transaction is based on a profitability realized by the entity processing the transaction in providing services to the entity requesting the transaction. The actions include receiving data indicating an instruction to apply the adjustment value to the predicted value; and executing the transaction with the predicted value adjusted by the adjustment value. The transaction details include compliance characteristics of the entity requesting the transaction based on a number of changes the entity requesting the transaction has requested for previous transactions.

Other implementations of this aspect include corresponding systems, apparatus, and computer programs recorded on computer storage devices, each configured to perform the operations of the methods.

Another innovative aspect of the subject matter described in this specification may be implemented in a method that includes the actions of accessing transaction history data that, for each of one or more past transactions, indicates one or more transaction details associated with the transaction, a predicted value, and a final value, wherein the one or more transaction details include a sentiment associated with an entity requesting the transaction, a value sensitivity of the entity, and a relationship between the entity requesting the transaction and an entity processing the transaction; for each of the one or more past transactions, determining a difference value between the predicted value and the final value; for each of the one or more past transactions, generating, using the one or more transaction details and the difference value, a predictive model that is trained to estimate, based on one or more given transaction details and a given predicted value, an adjustment value to apply to the given predicted value; and using the predictive model to estimate an adjustment value to apply to one or more subsequently received transaction details associated with a subsequent transaction.

These and other implementations can each optionally include one or more of the following features. The sentiment associated with an entity requesting the transaction is based on an analysis of media that includes references to the entity requesting the transaction and contexts of the references. The value sensitivity of the entity requesting the transaction is based on a likelihood of the entity to request adjusting the predicted value. The transaction is a stock trade. The predicted value is a predicted price per share. The adjustment value is an adjustment to the predicted price per share. The relationship between the entity requesting the transaction and the entity processing the transaction is based on a profitability realized by the entity processing the transaction in providing services to the entity requesting the transaction. The transaction details include compliance characteristics of the entity requesting the transaction based on a number of changes the entity requesting the transaction has requested for previous transactions.

Other implementations of this aspect include corresponding systems, apparatus, and computer programs recorded on computer storage devices, each configured to perform the operations of the methods.

Another innovative aspect of the subject matter described in this specification may be implemented in a method that includes the actions of accessing a predictive model that is trained to estimate, based on one or more given transaction details and a given predicted value, an adjustment value to apply to the given predicted value, wherein the one or more transaction details include a sentiment associated with an entity requesting the transaction, a value sensitivity of the entity, and a relationship between the entity requesting the transaction and an entity processing the transaction; receiving one or more transaction details and a predicted value associated with a subsequently received transaction; providing the one or more transaction details as input to the predictive model; in response to providing the one or more transaction details as input to the predictive model, receiving, from the predictive model, an adjustment value to apply to the predicted value; and providing, for output, data indicating the adjustment value.

These and other implementations can each optionally include one or more of the following features. The actions include accessing real-time data that is associated with the entity requesting the transaction; and based on the real-time data that is associated with the entity requesting the transaction, determining a real-time sentiment that is associated with the entity requesting the transaction. The action of providing the one or more transaction details as input to the predictive model includes providing data indicating the real-time sentiment that is associated with the entity requesting the transaction as additional input to the predictive model. The actions include accessing real-time data that is associated with the entity requesting the transaction and with the entity processing the transaction; and based on the real-time data that is associated with the entity requesting the transaction, determining a relationship between the entity requesting the transaction and the entity processing the transaction. The action of providing the one or more transaction details as input to the predictive model includes providing data indicating the relationship between the entity requesting the transaction and the entity processing the transaction as additional input to the predictive model. The actions include receiving data indicating an instruction to apply the adjustment value to the predicted value; and executing the transaction with the predicted value adjusted by the adjustment value. The transaction details include compliance characteristics of the entity requesting the transaction based on a number of changes the entity requesting the transaction has requested for previous transactions.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may identify a value for an order that has the highest likelihood of providing the most benefit to the entity facilitating the order.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
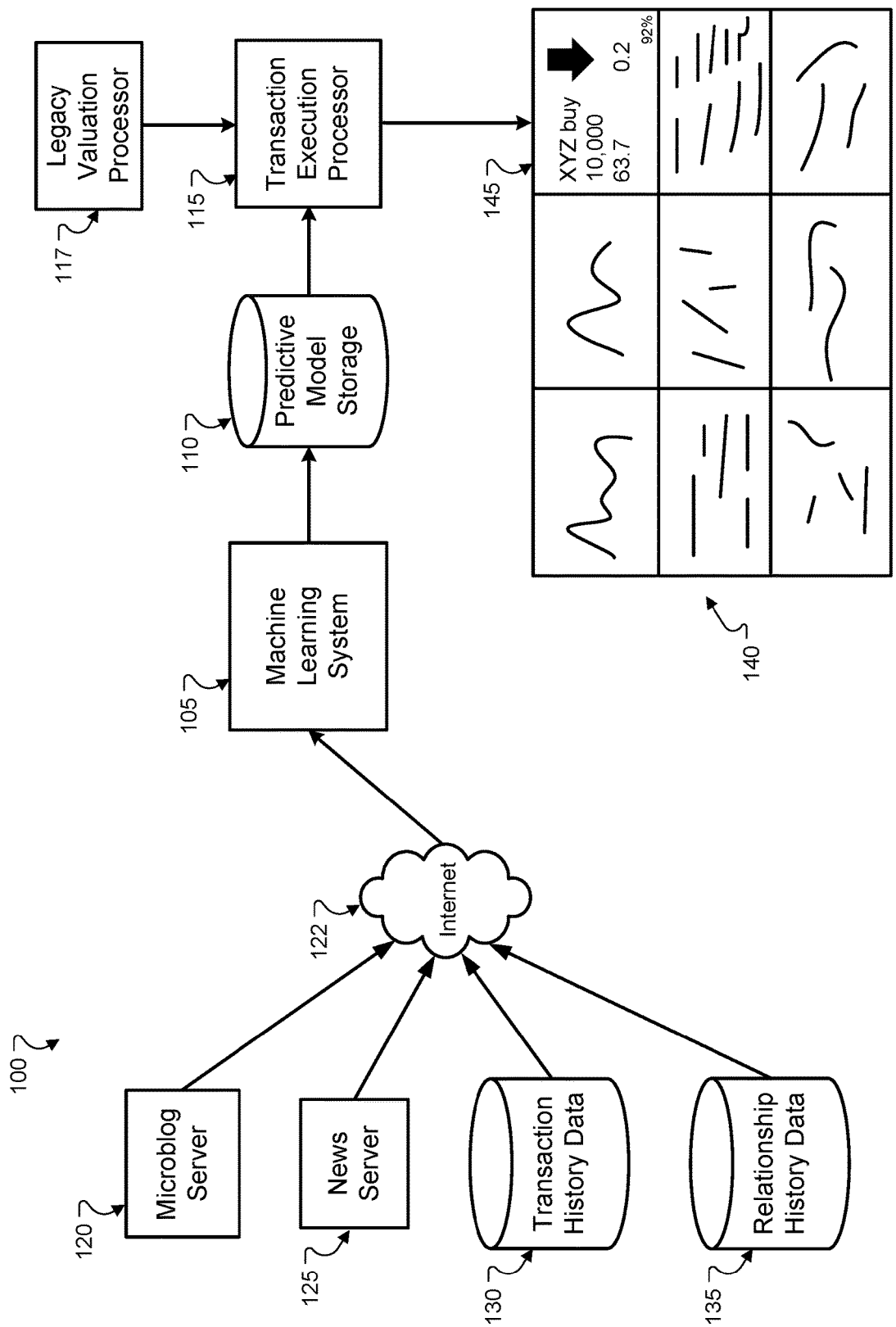
FIG. 1 illustrates an example system for predicting values for transactions.

FIG. 1 illustrates an example system 100 for predicting values for transactions. Briefly, and as described in further detail below, the system 100 assists a user in estimating an adjustment value to apply to a predicted value for a transaction. The system 100 may generate the adjustment value based on an output of a predictive model that processes data related to the transaction such as sentiment data, data related to an entity associated with the transaction (e.g., news events), and previous transactions.

The machine learning system 105 generates predictive models that are stored in the predictive model storage 110 and used by the transaction execution processor 115 during the processing of a transaction that is requested by an entity. Each predictive model is configured to provide an adjustment value to apply to a predicted value for a given transaction in addition to a confidence value for the adjustment value. For example, machine learning system 105 may use supervised learning techniques such as neural networks to generate the predictive models. The machine learning system 105 may generate a predictive model for each entity that requests transactions, for a group of entities or for all entities.

The machine learning system 105 accesses data stored on the microblog server 120. The microblog server 120 provides a platform for users to write and share microblogs. The microblog server 120 may provide an application programming interface (API) so that other systems can access and retrieve the microblog data directly over the internet 122. The microblogs written by the users may be related to any topic. For example, one user may write about a positive experience that the user had interacting with an entity. Another user may write about a negative experience that the user has interacting with the same entity. Many other users may write about experiences with the same entity. The machine learning system 105 may retrieve the microblogs related to one particular entity and extract a sentiment that users may be feeling towards that the entity. A positive sentiment suggests than values tied to an entity should be increased. A negative sentiment suggests that values tied to an entity should be decreased. The microblogs may be timestamped so that the machine learning system 105 may correlate a time period with each sentiment. In some implementations, the machine leaning system 105 receives sentiments and associated timestamps from a service that processes the microblogs to generate sentiments.

The machine learning system 105 accesses data stored on the news server 125. The news server 125 aggregates news articles written by various news sources and provides an API for other system to access and retrieve the articles directly over the internet 122. In some implementations, the news server 125 is a collection of different news servers that provide articles for users to read over the internet. In this instance, the machine learning system 105 may access each news server, possibly through an API, to retrieve articles. Similar to the microblogs, the machine learning system 105 may analyze the articles to identify the articles that mention different entities. The machine learning system 105 may analyzes the articles that mention a particular entity to determine a sentiment associated with that particular entity. A positive news outlook suggests than values tied to an entity should be increased. A negative news outlook suggests that values tied to an entity should be decreased. The machine learning system 105 may also attach a timestamp to the sentiment based on when the news server 125 published the articles. In addition to sentiments based on the news articles, the machine learning system 105 may identify particular events related to each entity based on the articles. For example, the machine learning system 105 may identify articles that are related to a particular entity hiring a new chief executive or the entity planning on reducing the size of its workforce. As another example, the machine learning system 105 may identify articles related to a particular entity that describes an upcoming earnings report or major recall. In some implementations, the machine learning system receives sentiments, events, and associated timestamps from a service that processes the news articles.

The machine learning system 105 accesses the transaction history data 130. The transaction history data 130 stores the data related to each of previous transactions. In particular the transaction history data 130 stores data for the entity requesting the transaction, the goods bought or sold in the transaction, the predicted value for the transaction, the final value for the transaction, and a timestamp. As an example, a transaction may involve ABC Fund selling five hundred thousand shares of stock. The stock trader accesses his trading system that suggests a price of fifty dollars per share. The stock trader offers ABC fund a price of 49.92 dollars per share. Once the stock trader sells all the shares of the stock, the final average price is 49.91. The difference in price suggests that the stock trader lost some money on the transaction by offering too high of a price per share. The transaction history data 130 may also store data related to liquidity for different goods or securities. Typically, a good that is less liquid is more difficult to sell and may cause the price to be less predictable. In some implementations, the transaction history data 130 offers an API that the machine learning system 105 uses to access the data.

The transaction history data 130 may also store data related any trade restrictions that were present during a transaction. For example, an entity requesting the transaction, or client, may have recently entered an agreement with the entity performing the transaction to begin performing transactions. The agreement may be for a particular type of good or security. The client may be restricted from trading other types of goods or securities. As another example, the client may lace sufficient margin on the client's account for the size of the requested transaction. The transaction history data 130 may also include the bid-ask spread for a particular transaction as well as the availability of any dark pool trading options for a particular security.

The machine learning system 105 access relationship history data 135. The relationship history data 135 includes data relation to the behavior of each entity during previous transactions. The data includes profitability data for each entity. The profitability indicates an amount of profit that the entity operating the system 100 has earned from doing business with each entity. The profitability data may indicate an amount of profit that the entity operating the system 100 has earned from each transaction with each entity. For example, the profitability data may indicate that the entity operating the system 100 has earned an average of ten thousand dollars from each transaction with ABC Fund. The machine learning system 105 accesses the profitability data and analyses the data for trends. For example, the profitability data for ABC Fund may indicate that the profitability for each transaction is has been steadily decreasing.

As another example, the relationship history data 135 may be related to a cost to serve for a particular entity, or client. Clients may be responsible for providing Standard Settlement Instructions and other details required to confirm a transaction. Some clients may not provide this information in a timely manner or provide incorrect information. Clients may also request special processing of a transaction such as requesting confirmation statements in paper form or in multiple languages or both. These actions cause the entity performing the transaction to perform extra work to identify the correct information and rectify the problem.

The relationship history data 135 includes compliance characteristics for each entity. The compliance characteristics indicate an amount of service that each entity requested during each prior transaction. The service may be related to the number of questions or requests that the entity had related to a particular transaction. The machine learning system 105 may receive the compliance characteristics compare the questions and requests for each of the entity's transactions. The machine learning system 105 may generate a quantity that represents an attention level that a client typically requires, where an entity with high level of attention utilizes more resources of the entity operating the system 100 than an entity with a low level of attention. The machine learning system 105 may identify trends in the level of attention required by each entity. For example, the level of attention require by ABC Fund may be decreasing during the recent period.

The relationship history data 135 includes value sensitivity data for each entity. The value sensitivity data may indicate an entity's historical behavior with respect to pushing for price adjustments. For example, a stock trader stock trader offers ABC fund a price of 49.92 dollars per share for stock that ABC Fund is selling. ABC Fund may try to negotiate a price of 49.88 dollars per share. In response to the negotiation, the stock trader may offer ABC Fund a price of 49.91 dollars per share. For this transaction, the value sensitivity data may indicate that ABC Fund attempted to adjust the price by 0.04 dollar per share and the stock trader adjusted the price 0.01 dollars per share. The value sensitivity data may also include percentage related to the requested adjustment and the actual adjustment.

The machine learning system 105 generates predictive models based on the data received from the microblog server 120, the news server 125, the transaction history data 130, and the relationship history server 135. The machine learning system 105 may generate predictive models using neural networks with a specified number of hidden layers received from the entity operating the system 100. The machine learning system 105 may continue to adjust the predictive models as additional transactions and data are received from the microblog server 120, the news server 125, the transaction history data 130, and the relationship history server 135. The adjustments may occur on a periodic basis such as every day or in real-time as the machine learning system 105 receives the data. The predictive models that may or may not be entity specific are stored in the predictive model storage 110. In some implementations, the entity performing the transaction may adjust the predictive models based on an amount of risk with which the entity is comfortable. The adjustments based on risk may occur daily or more than once per day and may be driven by the entity's views of market events, macroeconomic outlook, research, or other similar reasons. By adjusting the risk, the entity may maintain or increase profitability by taking on more risk in favorable conditions and taking on less risk in less favorable conditions.

The transaction execution processor 115 receives a request for a transaction from the entity operating the system 100. As the transaction execution processor 115 receives a request for a transaction from the entity operating the system 100, or the entity performing the transaction, the legacy valuation processor 117 receives a similar request for the transaction. The legacy valuation processor 117 applies legacy liquidity and pricing algorithms to calculate a value for a requested good. The legacy liquidity and pricing algorithms may factor in the number of pending transactions for the good. A good with many purchase orders compared to sell orders may be difficult to buy, and a good with few purchase orders compared to sell orders may be difficult to sell. The value calculated by the legacy valuation processor 117 may be used by the entity operating the system 100, but the value may not be properly adjusted to take into account current events, current sentiment, a current relationship between the entity and the client, and previous transactions between the entity and the client. To adjust the value, the transaction execution processor 115 applies a predictive model stored in the predictive model storage 110. The predictive model calculates an adjustment to the calculated price based on data similar to the data used to train the predictive model.

The transaction execution processor 115 receives data from the microblog server 120 to determine the current sentiment. The transaction execution processor 115 receives data from the news server 125 to determine current events. The transaction execution processor 115 receives transaction history data 130 that may include data related to the current value sensitivity of the entity and any value sensitivity trends. The transaction execution processor 115 receives relationship data for the entity from the relationship history data 135. Using this data, the transaction execution processor 115 calculates an adjustment value to apply to the suggested value. The user operating the system 100 may choose to apply the suggested value and provide the entity requesting the transaction with the value adjusted value. In some implementations, the predictive models may be entity specific. In this instance, the transaction execution processor 115 may only input the data from the microblog server 120 and the news server 125 as well as the goods and quantity to buy or sell into the predictive model.

The transaction execution processor 115 provides the output of the predictive model to the display 140. The display 140 provides a visualization of data from the microblog server 120, the news server 125, the transaction history data 130, and the relationship history server 135. Display corner 145 includes data related to the current transaction. The current transaction is the one requested by the entity that communicated the transaction to the entity operating the system 100. In this example, the entity request to buy ten thousand shares of XYZ stock. The suggested value as calculated by the transaction execution processor 115 pricing and liquidity algorithms is 63.7 dollars per share. The transaction execution processor 115 uses the predictive model to generate an adjustment value of decreasing the price 0.2 dollars per share. The transaction execution processor 115 also provides a confidence value for the adjustment value, which in this example, is ninety-two percent. The confidence value may be based in part on an amount of training data that the machine learning system used to generate the predictive model.

An example use case for the system 100 may be related to adjusting ratings for restaurants where a magazine has given a rating to the restaurant. The rating provided by the magazine may be similar to a value provided by a legacy valuation system 117. The transaction execution processor 115 applies a predictive model and additional signals to adjust the rating provided by the magazine to improve its accuracy. The machine learning system 105 may generate a predictive model based on previous ratings given by customers and any current events or sentiments that were present when each customer rated the restaurant. The transaction execution processor 115 may receive the magazine rating and the current news events and any sentiments that users may be posting online and apply the predictive model. The adjusted rating factors in the current sentiments and events but may not be as volatile as a current average user rating.

Another example use case for the system 100 may be related to adjusting prices for stocks as a trader receives a large order from a client. The trader's legacy valuation processor 117 may take into account the current state of the market such as current requests for purchases and sales and the current bid-offer spread. The trader is responsible for providing the client with the most accurate price and the price from the legacy system may not factor in the current sentiment and news. In some implementations, the trader underwrites the transaction. The transaction execution processor 115 receives a predictive model and current sentiment data, current news data, updated transaction history data, and current relationship data for the client. The transaction execution processor 115 generates a price adjustment to apply to the price provided by the legacy system. The trader receives the price adjustment through a graphical user interface. The trader may verify the price adjustment by analyzing the current sentiment and news manually and provide the adjusted price to the client.

The goal of the system 100 is to provide the client with an accurate price quote. Because the client may be purchasing or selling many shares of a particular security, the trader offers the client a price and then the trader attempts to execute the trade on the market. A more accurate price provides improved certainty for the trader and the client because with large orders even small price changes have large consequences for the trader and the client.

Figure 2:
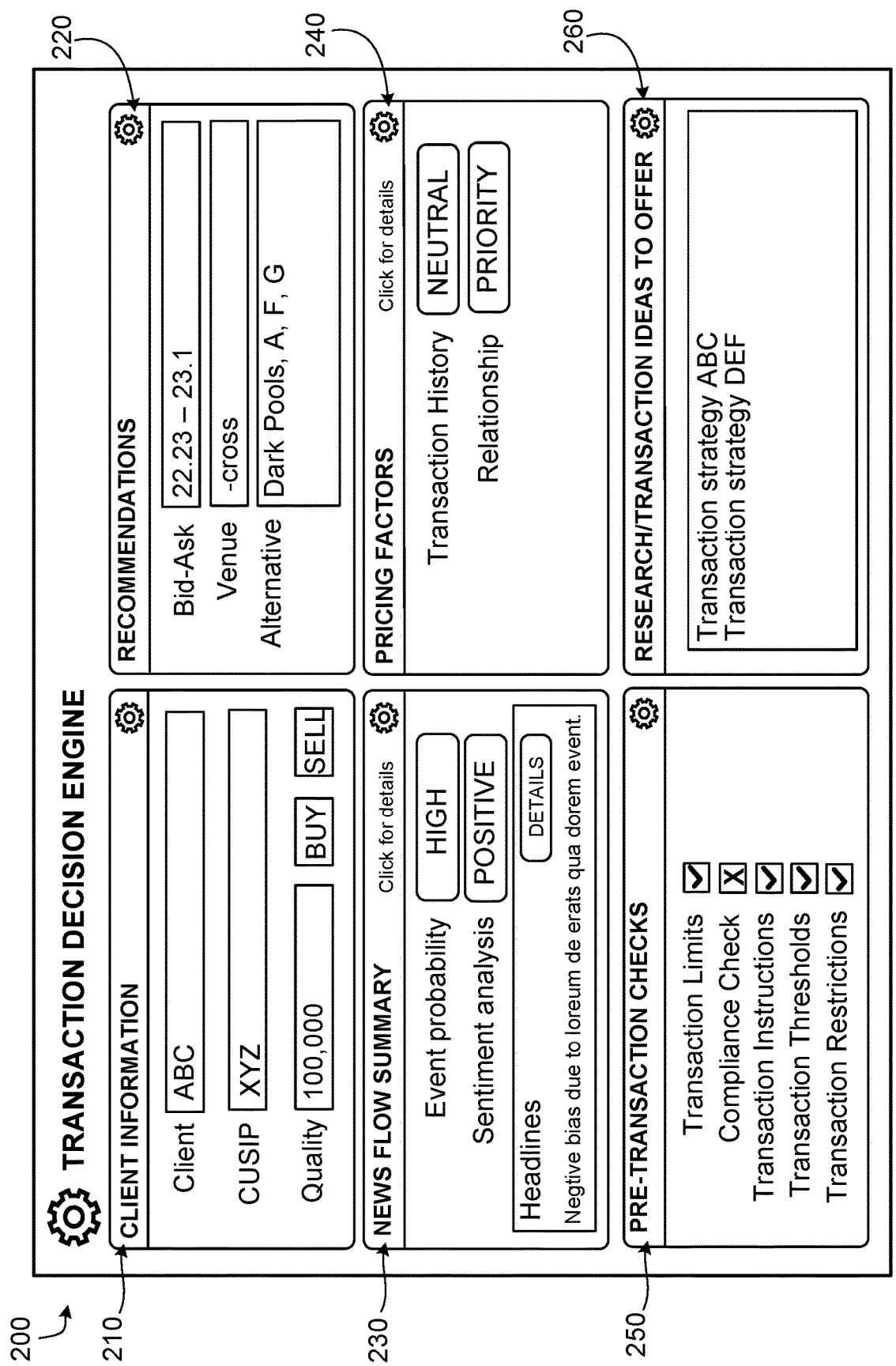
FIG. 2 illustrates an example user interface for predicting values for transactions.

FIG. 2 illustrates an example user interface 200 for predicting values for transactions. The user interface 200 illustrates a more detailed view of the display corner 145 from FIG. 1. The user interface 200 provides to the user a visualization of the transaction, the entity requesting the transaction, the goods, the value, current news and events, and an output of the predictive model.

The user interface 200 includes a client information section 210. In the client information section the user inputs the name of the client, the goods that the client is buying or selling, and the quantity of goods. In this example, ABC company is placing an order for one hundred thousand of XYZ goods. The user interface 200 includes a recommendation section 220. The recommendation section 220 includes information related to the current values for the goods. In this example, the XYZ goods are available for purchase at 23.1 dollars each and can be sold at 22.23 dollars each. The recommendation section notes the various venues that the XYZ goods may be bought and sold. The system may identify the various venues based on which venues have an approximately equal number of purchases and sales of the XYZ goods. The recommendation section 200 lists the main venue where the XYZ goods will likely be bought and sold as well as alternative venues.

The user interface 200 includes a news flow summary section 230. The news flow summary section 230 provides the user with information related to the current events and a sentiment related to the entity. The current events indicator displays an indication of a likelihood of an event occurring that affects the ability of an entity to complete the transaction at the price provided by the user. In this example, the news flow summary section 230 indicates that there is a high likelihood of an event occurring that may impact the closing of the transaction. The news flow summary section 230 also indicates that the current sentiment of the entity is positive. The news flow summary section 230 also indicates a sample headline of the articles processed by the system. The news flow summary section 230 allows the user to click any of the information sections to read more detail.

The user interface 200 includes a pricing factors section 240. The pricing factors section 240 includes details related to the entity requesting the transaction. The details may be related to the relationship between the entity and the user's company. For example, the pricing factors section 240 may indication a relationship level between the entity and the user's company. The relationship level may be based on a profitability for user's company by providing services to the entity relative to other companies. In user interface 200, the entity is a priority client for the user's company suggesting that serving the entity is very profitable. The pricing factors section 240 includes an indication of how much interaction was involved in previously serving the entity. For example, serving the entity may have required an average level of interaction such as answering a few inquiries and other questions. This history may place the entity in the neutral group.

The user interface 200 includes a visualization of the number of pre-transaction checks 250 that the system has performed. The pre-transaction checks 250 indicate whether the system has verified the transaction limits. The transaction limits may specify the amount of goods that an entity or the user's company may be able to buy or sell in a given period. For example, the user's company may be restricted to being involved in buying and selling over one million units of a particular good in a twenty-four hour period. The pre-transaction checks 250 indicate whether the system has verified the compliance checks for the entity and the user's company. In some instances, there may be restrictions on buying or selling a particular good either by the entity or the user's company. For example, the entity may be prohibited from buying good DEF.

The pre-transaction checks 250 indicate whether the system has verified the transaction instructions. For this check, the system may verify that the transaction instructions are complete that no order details are missing. The pre-transaction checks 250 indicate whether the system has verified that the order is within any required thresholds. For example, the entity may not be authorized to buy or sell more than one million units of a particular good in one transaction. The pre-transaction checks 250 indicate whether the system has verified whether there are any restrictions on the entity or the user's company for buying or selling the goods. For example, the user's company may have a restriction on selling or buying a particular good for the next two hours.

The pre-transaction checks 250 indicate research/transaction ideas 260 to offer the user. The research/transaction ideas 260 indicate the value adjustments that the system recommends to the user based on applying the order details, news flow, pricing factors, and the pre-transaction checks to the predictive model. The research/transaction ideas 260 may include more than one value adjustment. For example, the research/transaction ideas 260 may provide transaction strategy ABC. Selecting strategy ABC may display an adjustment of a 0.03 increase in the value with an eighty-five percent confidence. Selecting strategy DEF may display an adjustment of a 0.04 increase with a seventy percent confidence. Each of the strategies displayed in the research/transaction ideas 260 may be generated with different predictive models. The user may consider the provided strategies and provide a value to offer to the entity to execute the transaction.

Figure 3:
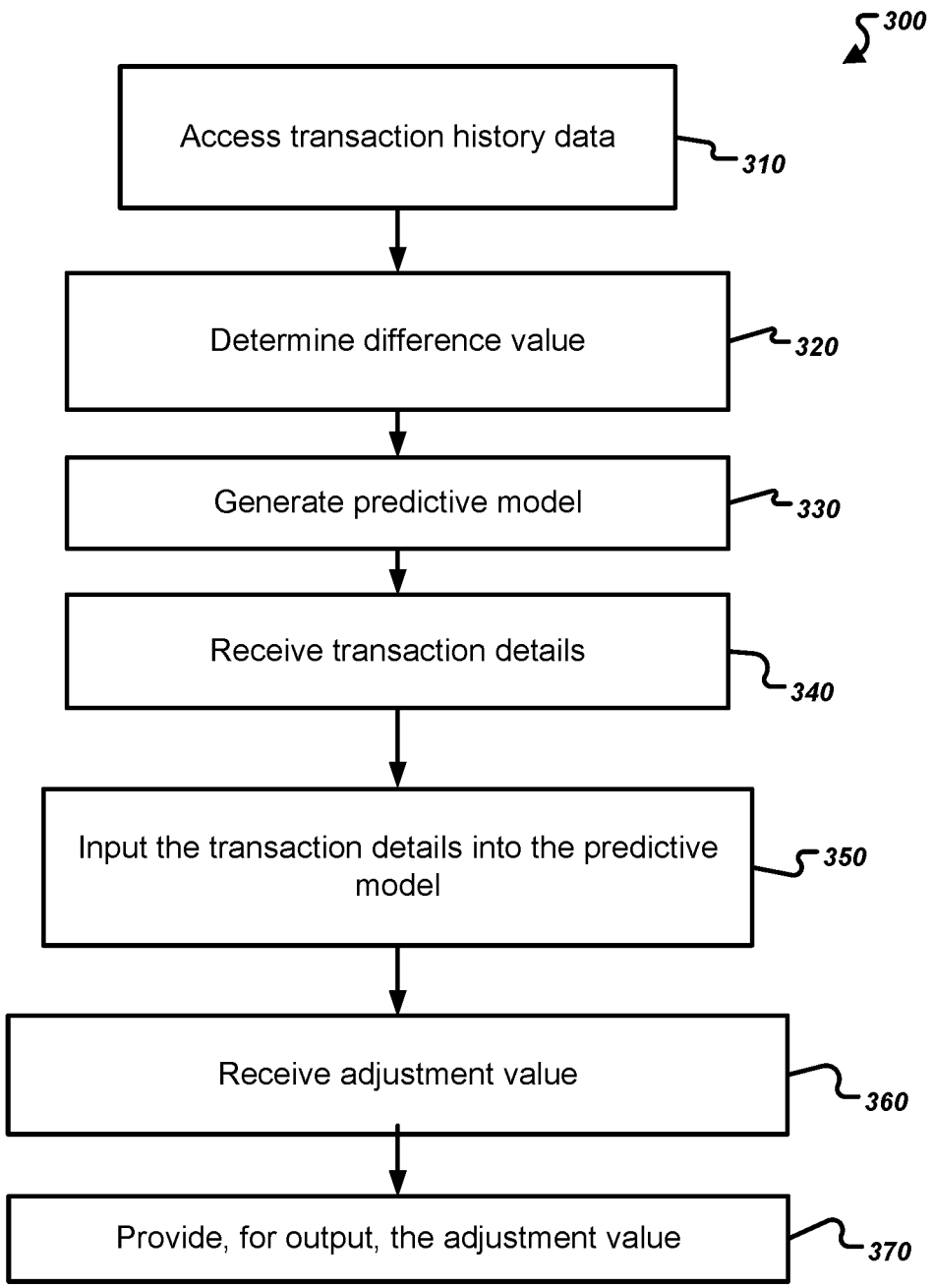
FIG. 3 illustrates an example process for predicting values for transactions.

FIG. 3 is a flow chart of an example process 300 for predicting values for transactions. In general, the process 300 provides an adjustment value for a user to apply to a predicted value to maximize profitability of a transaction. The process 300 will be described as being performed by a computer system comprising one or more computers, for example, the system 100 as shown in FIG. 1.

The system accesses transaction history data that, for each of one or more past transactions, indicates one or more transaction details associated with the transaction, a predicted value, and a final value, where the one or more transaction details include a sentiment associated with an entity requesting the transaction, a value sensitivity of the entity, and a relationship between the entity requesting the transaction and an entity processing the transaction (310). In some implementations, the sentiment associated with an entity requesting the transaction is based on an analysis of media that includes references to the entity requesting the transaction and contexts of the references. For example, the sentiment may be obtained from microblogging websites where users discuss and post about various topics including the entity requesting the transaction. In some implementations, the value sensitivity of the entity requesting the transaction is based on a likelihood of the entity to request adjusting the predicted value. For example, the entity requesting the transaction may typically push for a higher value when selling a good or a lower value when purchasing the good.

In some implementations, the relationship between the entity requesting the transaction and the entity processing the transaction is based on a profitability realized by the entity processing the transaction in providing services to the entity requesting the transaction. For example, providing transaction services to the entity requesting the transaction generate higher profits compared to other entities that request transactions. In some implementations, the transaction details include compliance characteristics of the entity requesting the transaction based on a number of changes the entity requesting the transaction has requested for previous transactions. For example, the entity requesting the transaction may require a high level of service because the entity requires confirmation in multiple languages and paper confirmations, thus increasing costs to the entity processing the transaction. In some implementations, the transaction is a stock trade, the predicted value is a predicted price per share, and the adjustment value is an adjustment to the predicted price per share.

The system, for each of the one or more past transactions, determines a difference value between the predicted value and the final value (320). The system, for each of the one or more past transactions, generates, using the one or more transaction details and the difference value, a predictive model that is trained to estimate, based on one or more given transaction details and a given predicted value, an adjustment value to apply to the given predicted value (330).

The system receives one or more transaction details and a predicted value associated with a subsequently received transaction (340). In some implementations, the system accesses real-time data that is associated with the entity requesting the transaction and based on the real-time data that is associated with the entity requesting the transaction, determine a real-time sentiment that is associated with the entity requesting the transaction. In some implementations, the system providing data indicating the real-time sentiment that is associated with the entity requesting the transaction as additional input to the predictive model. For example, the system may retrieve real-time data from microblogging servers for generating a real-time sentiment to apply to the predictive model.

In some implementations, the system accesses real-time data that is associated with the entity requesting the transaction and with the entity processing the transaction. In some implementations, based on the real-time data that is associated with the entity requesting the transaction, the system determines a relationship between the entity requesting the transaction and the entity processing the transaction. The system provides data indicating the relationship between the entity requesting the transaction and the entity processing the transaction as additional input to the predictive model. For example, the system may retrieve real-time data from new servers for generating a real-time news outlook to apply to the predictive model.

The system provides the one or more transaction details as input to the predictive model (350). The system, in response to providing the one or more transaction details as input to the predictive model, receives, from the predictive model, an adjustment value to apply to the predicted value (360). The system provides, for output, data indicating the adjustment value (370). In some implementations, the system receives data indicating an instruction to apply the adjustment value to the predicted value and executes the transaction with the predicted value adjusted by the adjustment value.

Figure 4:
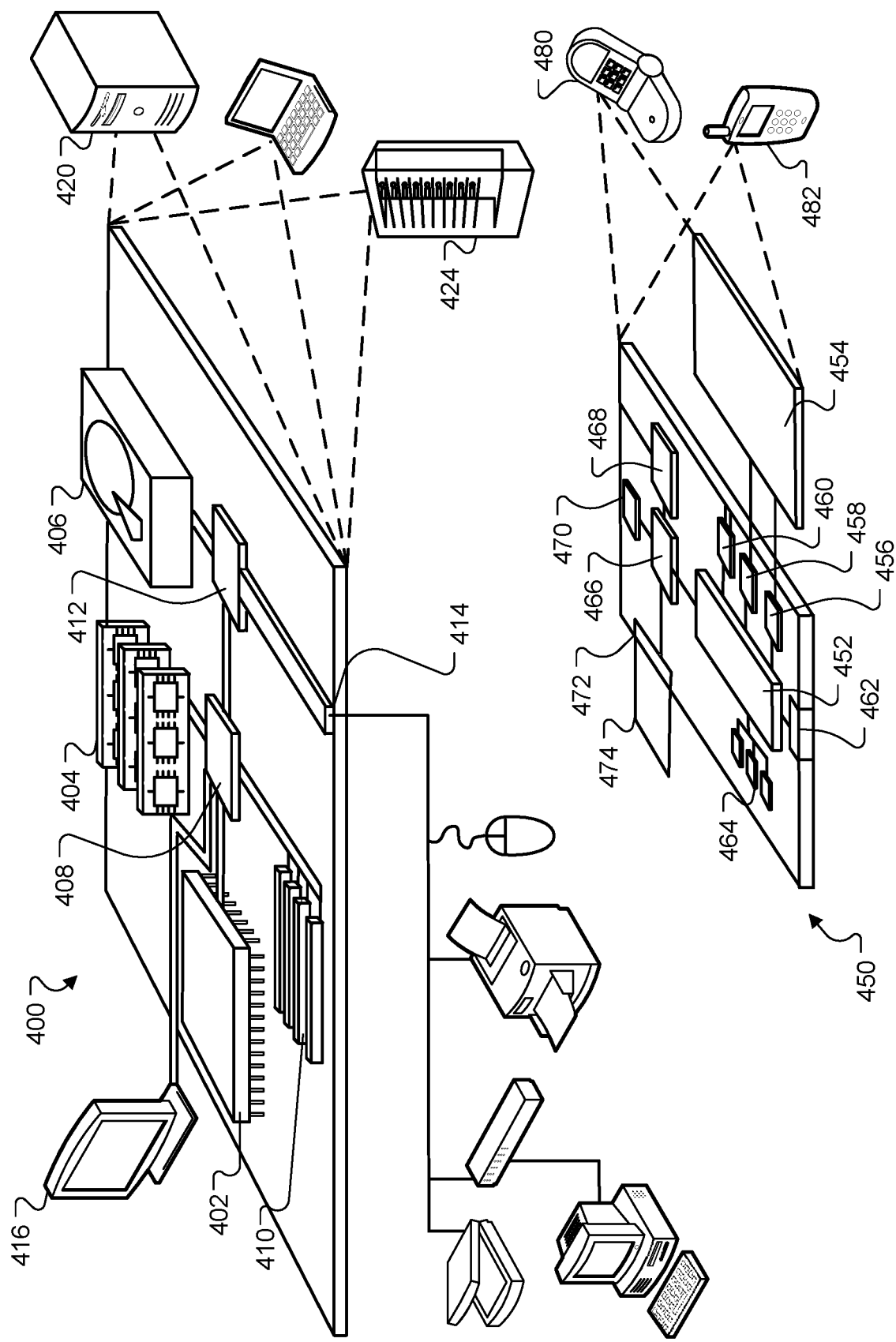
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
accessing transaction history data that, for each of one or more past transactions, indicates past transaction details associated with the past transaction, a past predicted value, and a past final value, wherein the past transaction details include a past sentiment associated with a past requesting entity requesting the past transaction, a past value sensitivity of the past requesting entity, and a past relationship between the past requesting entity requesting the past transaction and a past processing entity processing the past transaction;
for each of the one or more past transactions, determining a past difference value between the past predicted value and the past final value;
training, using machine learning and the past transaction details and the past difference value, a predictive model that is configured to receive a given sentiment associated with a given requesting entity requesting a given transaction, a given value sensitivity of the given requesting entity, a given relationship between the given requesting entity and a given processing entity processing the given transaction, and a given predicted value associated with the given transaction and output a given difference value to apply to the given predicted value;
receiving a sentiment associated with a requesting entity requesting a transaction, a value sensitivity of the requesting entity, a relationship between the requesting entity and a processing entity processing the transaction, and a predicted value associated with the transaction;
providing the sentiment associated with the requesting entity requesting the transaction, the value sensitivity of the requesting entity, the relationship between the requesting entity and the processing entity processing the transaction, and the predicted value associated with the transaction as input to the predictive model;
in response to providing the sentiment associated with the requesting entity requesting the transaction, the value sensitivity of the requesting entity, the relationship between the requesting entity and the processing entity processing the transaction, and the predicted value associated with the transaction as input to the predictive model, receiving, from the predictive model, an adjustment value to apply to the predicted value; and
providing, for output, data indicating the adjustment value.

2. The method of claim 1, wherein:
the past sentiment associated with the past requesting entity is a past real-time sentiment that is based on past real-time data associated with the past requesting entity,
the given sentiment associated with the given requesting entity is a given real-time sentiment that is based on given real-time data associated with the given requesting entity, and
the sentiment associated with the requesting entity is a real-time sentiment that is based on real-time data associated with the requesting entity.

3. The method of claim 1, wherein:
the past relationship between the past requesting entity requesting the past transaction and the past processing entity processing the past transaction is based on past real-time data associated with the past requesting entity and the past processing entity,
the given relationship between the given requesting entity requesting the given transaction and the given processing entity processing the given transaction is based on given real-time data associated with the given requesting entity and the given processing entity, and
the relationship between the requesting entity requesting the transaction and the processing entity processing the transaction is based on real-time data associated with the requesting entity and the processing entity.

4. The method of claim 1, wherein:
the past sentiment associated with the past requesting entity requesting the past transaction is based on an analysis of past media that includes past references to the past requesting entity requesting the past transaction and contexts of the past references,
the given sentiment associated with the given requesting entity requesting the given transaction is based on an analysis of given media that includes given references to the given requesting entity requesting the given transaction and contexts of the given references, and the sentiment associated with the requesting entity requesting the transaction is based on an analysis of media that includes references to the requesting entity requesting the transaction and contexts of the references.

5. The method of claim 1, wherein:

the past value sensitivity of the past requesting entity requesting the past transaction is based on a past likelihood of the past requesting entity requesting an adjustment to the past predicted value, the given value sensitivity of the given requesting entity requesting the given transaction is based on a given likelihood of the given requesting entity requesting an adjustment to the given predicted value, and the value sensitivity of the requesting entity requesting the transaction is based on a likelihood of the requesting entity requesting an adjustment to the predicted value.

6. The method of claim 1, wherein:

the transaction is a stock trade, the predicted value is a predicted price per share, and the adjustment value is an adjustment to the predicted price per share.

7. The method of claim 1, wherein:

the past relationship between the past requesting entity requesting the past transaction and the past processing entity processing the past transaction is based on a past profitability realized by the past processing entity processing the past transaction in providing past services to the past requesting entity requesting the past transaction, the given relationship between the given requesting entity requesting the given transaction and the given processing entity processing the given transaction is based on a given profitability realized by the given processing entity processing the given transaction in providing given services to the given requesting entity requesting the given transaction, and the relationship between the requesting entity requesting the transaction and the processing entity processing the transaction is based on a profitability realized by the processing entity processing the transaction in providing services to the requesting entity requesting the transaction.

8. The method of claim 1, comprising:

receiving data indicating an instruction to apply the adjustment value to the predicted value; and executing the transaction with the predicted value adjusted by the adjustment value.

9. The method of claim 1, wherein:

the past relationship between the past requesting entity requesting the past transaction and the past processing entity processing the past transaction is based on a number of changes the past requesting entity requesting the past transaction has requested for past previous transactions with the past processing entity, the given relationship between the given requesting entity requesting the given transaction and the given processing entity processing the given transaction is based on a number of changes the given requesting entity requesting the given transaction has requested for given previous transactions with the given processing entity, and the relationship between the requesting entity requesting the transaction and the processing entity processing the transaction is based on a number of changes the requesting entity requesting the transaction has requested for previous transactions with the processing entity.

10. A system comprising:

one or more computers and one or more storage devices storing instructions that are operable, when executed by the one or more computers, to cause the one or more computers to perform operations comprising:

accessing transaction history data that, for each of one or more past transactions, indicates past transaction details associated with the past transaction, a past predicted value, and a past final value, wherein the past transaction details include a past sentiment associated with a past requesting entity requesting the past transaction, a past value sensitivity of the past requesting entity, and a past relationship between the past requesting entity requesting the past transaction and a past processing entity processing the past transaction;

for each of the one or more past transactions, determining a past difference value between the past predicted value and the past final value;

training, using machine learning and the past transaction details and the past difference value, a predictive model that is configured to receive a given sentiment associated with a given requesting entity requesting a given transaction, a given value sensitivity of the given requesting entity, a given relationship between the given requesting entity and a given processing entity processing the given transaction, and a given predicted value associated with the given transaction and output a given difference value to apply to the given predicted value;

receiving a sentiment associated with a requesting entity requesting a transaction, a value sensitivity of the requesting entity, a relationship between the requesting entity and a processing entity processing the transaction, and a predicted value associated with the transaction;

providing the sentiment associated with the requesting entity requesting the transaction, the value sensitivity of the requesting entity, the relationship between the requesting entity and the processing entity processing the transaction, and the predicted value associated with the transaction as input to the predictive model;

in response to providing the sentiment associated with the requesting entity requesting the transaction, the value sensitivity of the requesting entity, the relationship between the requesting entity and the processing entity processing the transaction, and the predicted value associated with the transaction as input to the predictive model, receiving, from the predictive model, an adjustment value to apply to the predicted value; and providing, for output, data indicating the adjustment value.

11. The system of claim 10, wherein:

the past sentiment associated with the past requesting entity requesting the past transaction is based on an analysis of past media that includes past references to the past requesting entity requesting the past transaction and contexts of the past references, the given sentiment associated with the given requesting entity requesting the given transaction is based on an analysis of given media that includes given references to the given requesting entity requesting the given transaction and contexts of the given references, and the sentiment associated with the requesting entity requesting the transaction is based on an analysis of media that includes references to the requesting entity requesting the transaction and contexts of the references.

12. The system of claim 10, wherein:

the past value sensitivity of the past requesting entity requesting the past transaction is based on a past likelihood of the past requesting entity requesting an adjustment to the past predicted value, the given value sensitivity of the given requesting entity requesting the given transaction is based on a given likelihood of the given requesting entity requesting an adjustment to the given predicted value, and the value sensitivity of the requesting entity requesting the transaction is based on a likelihood of the requesting entity requesting an adjustment to the predicted value.

13. The system of claim 10, wherein:

the transaction is a stock trade, the predicted value is a predicted price per share, and the adjustment value is an adjustment to the predicted price per share.

14. The system of claim 10, wherein:

the past relationship between the past requesting entity requesting the past transaction and the past processing entity processing the past transaction is based on a past profitability realized by the past processing entity processing the past transaction in providing past services to the past requesting entity requesting the past transaction, the given relationship between the given requesting entity requesting the given transaction and the given processing entity processing the given transaction is based on a given profitability realized by the given processing entity processing the given transaction in providing given services to the given requesting entity requesting the given transaction, and the relationship between the requesting entity requesting the transaction and the processing entity processing the transaction is based on a profitability realized by the processing entity processing the transaction in providing services to the requesting entity requesting the transaction.

15. The system of claim 10, wherein:

the past relationship between the past requesting entity requesting the past transaction and the past processing entity processing the past transaction is based on a number of changes the past requesting entity requesting the past transaction has requested for past previous transactions with the past processing entity, the given relationship between the given requesting entity requesting the given transaction and the given processing entity processing the given transaction is based on a number of changes the given requesting entity requesting the given transaction has requested for given previous transactions with the given processing entity, and the relationship between the requesting entity requesting the transaction and the processing entity processing the transaction is based on a number of changes the requesting entity requesting the transaction has requested for previous transactions with the processing entity.

16. A non-transitory computer-readable medium storing software comprising instructions executable by one or more computers which, upon such execution, cause the one or more computers to perform operations comprising:

accessing transaction history data that, for each of one or more past transactions, indicates past transaction details associated with the past transaction, a past predicted value, and a past final value, wherein the past transaction details include a past sentiment associated with a past requesting entity requesting the past transaction, a past value sensitivity of the past requesting entity, and a past relationship between the past requesting entity requesting the past transaction and a past processing entity processing the past transaction;

for each of the one or more past transactions, determining a past difference value between the past predicted value and the past final value;

training, using machine learning and the past transaction details and the past difference value, a predictive model that is configured to receive a given sentiment associated with a given requesting entity requesting a given transaction, a given value sensitivity of the given requesting entity, a given relationship between the given requesting entity and a given processing entity processing the given transaction, and a given predicted value associated with the given transaction and output a given difference value to apply to the given predicted value;

receiving a sentiment associated with a requesting entity requesting a transaction, a value sensitivity of the requesting entity, a relationship between the requesting entity and a processing entity processing the transaction, and a predicted value associated with the transaction;

providing the sentiment associated with the requesting entity requesting the transaction, the value sensitivity of the requesting entity, the relationship between the requesting entity and the processing entity processing the transaction, and the predicted value associated with the transaction as input to the predictive model;

in response to providing the sentiment associated with the requesting entity requesting the transaction, the value sensitivity of the requesting entity, the relationship between the requesting entity and the processing entity processing the transaction, and the predicted value associated with the transaction as input to the predictive model, receiving, from the predictive model, an adjustment value to apply to the predicted value; and providing, for output, data indicating the adjustment value.

17. The medium of claim 16, wherein:

the past sentiment associated with the past requesting entity is a past real-time sentiment that is based on past real-time data associated with the past requesting entity, the given sentiment associated with the given requesting entity is a given real-time sentiment that is based on given real-time data associated with the given requesting entity, and the sentiment associated with the requesting entity is a real-time sentiment that is based on real-time data associated with the requesting entity.

18. The medium of claim 16, wherein:

the past relationship between the past requesting entity requesting the past transaction and the past processing entity processing the past transaction is based on past real-time data associated with the past requesting entity and the past processing entity, the given relationship between the given requesting entity requesting the given transaction and the given processing entity processing the given transaction is based on given real-time data associated with the given requesting entity and the given processing entity, and the relationship between the requesting entity requesting the transaction and the processing entity processing the transaction is based on real-time data associated with the requesting entity and the processing entity.

19. The medium of claim 16, wherein the operations further comprise:

receiving data indicating an instruction to apply the adjustment value to the predicted value; and executing the transaction with the predicted value adjusted by the adjustment value.

20. The medium of claim 16, wherein:

the past relationship between the past requesting entity requesting the past transaction and the past processing entity processing the past transaction is based on a number of changes the past requesting entity requesting the past transaction has requested for past previous transactions with the past processing entity, the given relationship between the given requesting entity requesting the given transaction and the given processing entity processing the given transaction is based on a number of changes the given requesting entity requesting the given transaction has requested for given previous transactions with the given processing entity, and the relationship between the requesting entity requesting the transaction and the processing entity processing the transaction is based on a number of changes the requesting entity requesting the transaction has requested for previous transactions with the processing entity.

* * * * *